United States Patent
Perret et al.

(10) Patent No.: US 8,556,184 B2
(45) Date of Patent: Oct. 15, 2013

(54) CHIPLESS PASSIVE RFID TAG

(75) Inventors: Etienne Perret, Grenoble Cedex (FR); Smail Tedjini, Grenoble Cedex (FR); Nair Deepn Vasudevan, Grenoble Cedex (FR); Frédéric Garet, Saint-Baldoph (FR); Lionel Duvillaret, Chambery (FR); Arnaud Maurice Vena, Guilherand-Granges (FR)

(73) Assignees: Institut Polytechnique de Grenoble, Grenoble Cedex 1 (FR); Universite de Savoie, Chambery (FR)

( * ) Notice: Subject to any disclaimer, the term of this patent is extended or adjusted under 35 U.S.C. 154(b) by 0 days.

(21) Appl. No.: 13/578,200

(22) PCT Filed: Feb. 8, 2011

(86) PCT No.: PCT/FR2011/050264
§ 371 (c)(1), (2), (4) Date: Sep. 25, 2012

(87) PCT Pub. No.: WO2011/098719
PCT Pub. Date: Aug. 18, 2011

(65) Prior Publication Data
US 2013/0015248 A1    Jan. 17, 2013

(30) Foreign Application Priority Data
Feb. 11, 2010   (FR) ..................................... 10 50971

(51) Int. Cl.
*G06K 19/06* (2006.01)
(52) U.S. Cl.
USPC ...................................... 235/492; 340/572.1

(58) Field of Classification Search
USPC ...................................... 235/492; 340/572.1
See application file for complete search history.

(56) References Cited

U.S. PATENT DOCUMENTS

| 8,179,231 B1* | 5/2012 | Varahramyan et al. ...... 340/10.1 |
| 2002/0145036 A1 | 10/2002 | Otto |
| 2009/0224916 A1* | 9/2009 | Angell et al. .............. 340/572.1 |

FOREIGN PATENT DOCUMENTS

EP    1811432 A1    7/2007

OTHER PUBLICATIONS

Blischak, Andrew; Manteghi, Majid, "Pole Residue Techniques for Chipless RFID Detection", Antennas and Propagation Society International Symposium, Jun. 1-6, 2009, ISSN: 1522-3965.
International Search Report issued in PCT/FR2011/050264 on Aug. 18, 2011.
Written Opinion of the International Searching Authority issued in PCT/FR2011/050264.

* cited by examiner

*Primary Examiner* — Kristy A Haupt
(74) *Attorney, Agent, or Firm* — Vedder Price PC

(57) ABSTRACT

A chipless RFID tag comprises a plurality of disjoint parallel conducting bands formed on a dielectric support, in which conducting bridges interlink neighboring conducting bands, the conducting bridges delimiting, between the conducting bands, portions of dielectric bands of distinct lengths, each portion of dielectric brand determining a resonant frequency of the tag, the set of resonant frequencies of the tag defining an identification code.

9 Claims, 4 Drawing Sheets

CHIPLESS PASSIVE RFID TAG

FIELD OF THE INVENTION

The present invention relates to a tag capable of storing data remotely readable by an adapted read terminal. The invention more specifically aims at a technology of remote identification by electromagnetic waves, currently called RFID, for "Radio Frequency Identification", in the art. Devices operating at frequencies ranging between 10 MHz and 10 THz are more specifically considered herein.

DISCUSSION OF PRIOR ART

Data exchange systems in RFID technology are currently used to recognize and/or to identify, at small or medium distance, all types of objects bearing an adapted tag.

FIG. 1 very schematically illustrates a remote identification system in RFID technology, comprising a read terminal 1 and an identification tag (TAG) 3. Read terminal 1 especially comprises an antenna, coupled to a radio wave transceiver device. Tag 3 contains identification data and is capable, when placed close to the read terminal, of receiving the signal transmitted by the read terminal and of specifically interfering with this signal according to its identification data. This interaction is detected by read terminal 1, which can deduce the tag identification data therefrom.

There mainly exist two types of RFID tags, that is, tags comprising an integrated electronic circuit, called chip tags, and tags comprising no integrated electronic circuit, generally called chipless tags in the art.

RFID chip tags generally comprise an antenna, an electronic circuit, a memory for storing an identification code, and a transponder for receiving the signal transmitted by the read terminal and for transmitting as a response, in a determined frequency band, a modulated signal containing the identification code stored in the memory. Some RFID chip tags, called active tags, comprise a battery for powering the chip. In other RFID tags, called passive tags, part of the power carried by the radio waves transmitted by the read terminal is used to power the chip. Passive tags have the advantage of requiring no internal power supply.

Due to the presence of electronic circuits in RFID chip tags, such tags have a non-negligible cost. The forming of chipless tags has been provided to decrease this cost. RFID chipless tags are considered herein.

FIG. 2 is a perspective view schematically showing an example of chipless RFID tag 21. Tag 21 is formed from a dielectric substrate 23, for example, having the shape of a rectangular wafer of 18×35 mm, with a thickness of approximately 1 mm. The rear surface of substrate 23 is covered with a metal ground plane 25. On the upper surface side of substrate 23 are formed separate parallel conductive strips, five strips 27a to 27e in the present example. Strips 27a to 27e differ from one another by their dimensions (length and/or width) and by their surface areas.

Tag 21 forms a structure with resonant elements capable of interfering with a radio signal transmitted by an RFID read terminal (not shown). Each conductive strip 27a to 27e behaves as a resonant LC-type circuit, capable of retransmitting a specific electromagnetic wave that can then be detected by the read terminal. Inductance L especially depends on the length of the conductive strip. Capacitance C corresponds to the capacitance formed between the conductive strip and ground plane 25, and especially depends on the conductive strip surface area and on the thickness of the substrate as well as on its dielectric properties. Thus, each conductive strip 27a to 27e determines, by its geometry, a resonance frequency of tag 21. In this example, each strip 27a to 27e defines a specific resonance frequency ranging between 5 and 6 GHz.

In operation, the read terminal transmits a radio signal having a spectrum comprising all the resonance frequencies of the tags that it is likely to read. If tag 21 is close to the read terminal, the read terminal detects a peak (and/or a trough) of the signal at the resonance frequencies determined by strips 27a to 27e, which translates as the appearing of five different lines in the power spectrum of the radio signal. The positions of these five strips in the spectrum enable the read terminal to uniquely identify tag 21.

Chipless RFID tags are passive by nature since they require no electric power supply.

Although the tags described in relation with FIG. 2 are less expensive to manufacture than chip tags, their cost however remains non negligible. This is especially due to the fact that the support substrate used to form the tag should comprise a ground plane and have a specific thickness and well-defined dielectric properties.

It would be desirable to have tags of very low cost, which can especially be used as disposable identification devices, for example, in food packaging.

Further, the data storage capacity per surface area unit of chipless tags of the type described in relation with FIG. 2 is relatively low. In the example of FIG. 2, a tag of 18×35 mm, operating at frequencies approximately ranging from 5 to 6 GHz, only enables to store a five-bit code. It should be noted that by increasing the operating frequency range, the tag size can be decreased. It would however be desirable to have chipless RFID cards having a greater storage capacity per surface area unit, for a given operating frequency range.

SUMMARY

Thus, an object of an embodiment of the present invention is to provide a chipless RFID tag at least partly overcoming some of the disadvantages of conventional chipless RFID tags.

An object of an embodiment of the present invention is to provide such a tag which is less expensive and easier to manufacture than conventional chipless RFID tags.

An object of an embodiment of the present invention is to provide such a tag that can be easily formed on any type of support, for example, by simple printing or screen printing of conductive tracks on a single surface of any type of package (for example, made of cardboard or paper).

An object of an embodiment of the present invention is to provide such a tag enabling to store more data per surface area unit than conventional chipless RFID tags.

Thus, an embodiment of the present invention provides a chipless RFID tag comprising a plurality of separate parallel conductive strips formed on a dielectric support, wherein conductive bridges interconnect neighboring conductive strips, the conductive bridges delimiting, between the conductive strips, portions of dielectric strips of different lengths, each dielectric strip portion determining a resonance frequency of the tag, the resonance frequencies of the tag altogether defining an identification code.

According to an embodiment of the present invention, a dielectric strip, not shorted by a conductive bridge, is arranged between each pair of neighboring conductive strips interconnected by a conductive bridge.

According to an embodiment of the present invention, all neighboring conductive strips are interconnected by conductive bridges.

According to an embodiment of the present invention, the width of a conductive strip comprised between two neighboring dielectric strips is at least equal to three times the width of the adjacent conductive strips.

According to an embodiment of the present invention, the conductive strips are U-shaped in top view.

According to an embodiment of the present invention, the conductive strips have the shape of portions of circles in top view.

According to an embodiment of the present invention, the conductive strips are rectilinear, pairs of neighboring strips having the same length and pairs of neighboring strips having different lengths.

According to an embodiment of the present invention, the portions of dielectric strips all have the same width.

Another embodiment of the present invention provides a method for coding data readable by an electromagnetic wave transceiver, comprising the steps of: forming a plurality of separate parallel conductive strips on a dielectric support; forming conductive bridges interconnecting neighboring conductive strips, so that the conductive bridges delimit, between the conductive strips, portions of dielectric strips of different lengths, each dielectric strip portion determining a resonance frequency; and associating with each resonance frequency a portion of the data.

BRIEF DESCRIPTION OF THE DRAWINGS

The foregoing and other objects, features and advantages of the present invention will be discussed in detail in the following non-limiting description of specific embodiments in connection with the accompanying drawings, among which.

DETAILED DESCRIPTION

Figure 1:
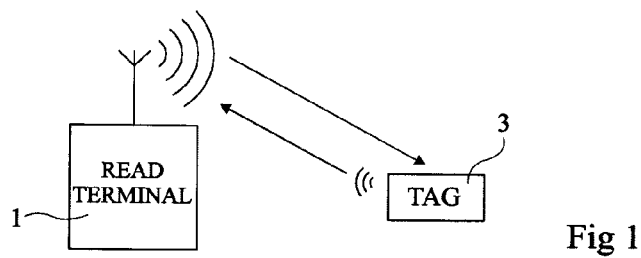
FIG. 1, previously described, very schematically illustrates a remote identification system in RFID technology.

For clarity, the same elements have been designated with the same reference numerals in the different drawings and, further, the various drawings are not to scale.

Figures 3, 4:
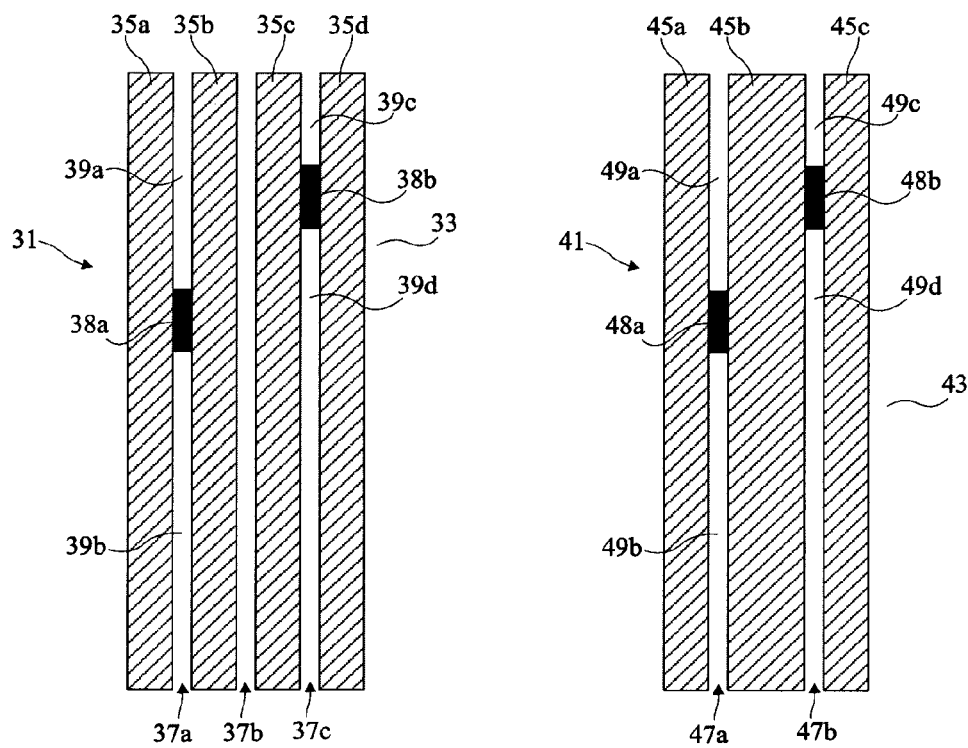
FIG. 3 is a top view schematically showing an embodiment of a chipless RFID tag.
FIG. 4 is a top view schematically showing another embodiment of a chipless RFID tag.

FIG. 3 is a top view schematically showing an embodiment of a chipless RFID tag 31. Tag 31 is formed on a dielectric support 33 and supports conductive patterns on a single one of its two surfaces. Four separate parallel rectilinear conductive strips 35a to 35d are formed on this surface. Strips 35a to 35d are identical, aligned along a direction perpendicular to the strips, and spaced apart from one another by a same step. Thus, conductive strips 35a to 35d delimit three identical rectilinear dielectric strips 37a to 37c. Conductive bridges interconnect neighboring conductive strips to delimit, between the conductive strips, portions of dielectric strips of different lengths. In this example, two conductive bridges 38a and 38b respectively interconnect neighboring left-hand conductive strips 35a and 35b and neighboring right-hand conductive strips 35c and 35d. Thus, each of the left-hand and right-hand dielectric strips, respectively 37a and 37c, is divided into two portions of dielectric strips. The tag thus comprises four portions of dielectric strips of different lengths 39a to 39d. Central dielectric strip 37b thus is not shorted by a conductive bridge.

Tag 31 forms a structure with resonant elements capable of interfering with an electromagnetic signal transmitted by an RFID read terminal (not shown). Each dielectric strip portion 39a to 39d is mainly surrounded with a U-shaped conductive path. Thus, each dielectric strip portion 39a to 39d defines an LC-type resonant circuit capable of retransmitting a specific electromagnetic wave which can then be detected by the read terminal. Inductance L especially depends on the length of the U-shaped conductive path, and thus on the length of the dielectric strip portion. The two parallel branches of the U-shaped conductive path, separated by the dielectric strip portion, form capacitance C. Thus, each dielectric strip portion 39a to 39d determines, by its length, a resonance frequency of tag 31. The resonance frequencies of the tag altogether define an identification code. The tag identifier is thus especially determined by the length and/or the position of conductive bridges 38a and 38b.

According to an example of an RFID tag forming method, tags comprising the basic pattern created by the parallel conductive strips may be formed at a large scale, and the final user may be given the possibility of forming the conductive bridges by himself, for example, by printing with a conductive ink. An advantage of such a method is that it enables the final user to customize the identifiers of its tags.

Central dielectric strip 37b, non-shorted by a conductive bridge, has the function of avoiding stray coupling phenomena between resonant regions of the tag. Thus, a modification of the length of a dielectric strip portion causes a modification of the resonance frequency associated with this strip portion, but has no influence upon the resonance frequencies associated with the other strip portions.

FIG. 4 is a top view schematically showing another embodiment of a chipless RFID tag 41. Tag 41 is formed on a dielectric support 43. On one surface of support 43 are formed three separate parallel rectilinear conductive strips 45a to 45c. Strips 45a to 45c are spaced apart from one another by a same step. Thus, conductive strips 45a to 45c delimit three identical rectilinear dielectric strips 47a and 47b. Conductive bridges interconnect the neighboring conductive strips to delimit, between the conductive strips, portions of dielectric strips of different lengths. In this example, two conductive bridges 48a and 48b respectively interconnect neighboring conductive strips 45a and 45b and neighboring conductive strips 45b and 45c. Thus, each of dielectric strips 47a and 47b is divided into two portions of dielectric strips of different lengths. The tag thus comprises four portions of dielectric strips of different lengths 49a to 49d. Unlike tag 31 of FIG. 3, tag 41 does not comprise a central dielectric strip not shorted by a conductive bridge. Central conductive strip 45b is provided to have a sufficient length, to avoid stray coupling phenomena between resonant slots of the tag. As an example, central strip 45b has a width at least equal to three times the width of lateral strips 45a, 45c.

Figure 2:
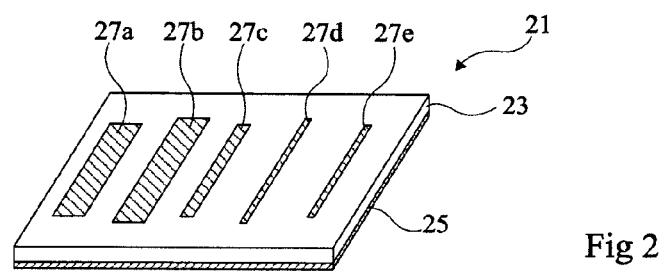
FIG. 2, previously described, is a perspective view schematically showing a chipless RFID tag.

An advantage of RFID tags of the type described in relation with FIGS. 3 and 4 is that they are easier to manufacture than tags of the type described in relation with FIG. 2. Indeed, unlike tag 21 of FIG. 2, tags 31 and 41 of FIGS. 3 and 4 comprise no ground plane. Tags 31 and 41 may be formed, by deposition or by printing with a conductive ink, on a single surface of any dielectric support. Tags may in particular be formed directly on the objects which are desired to be tagged, for example, on food packagings.

Figure 5:
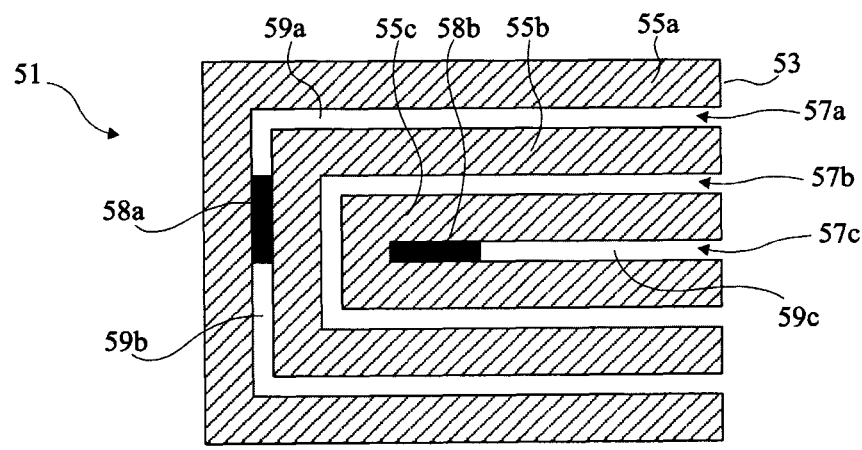
FIG. 5 is a top view schematically showing another embodiment of a chipless RFID tag.

FIG. 5 is a top view schematically showing a preferred alternative embodiment of a chipless RFID tag 51. Tag 51 is formed on a dielectric support 53. One surface of support 53 supports separate parallel conductive strips in the shape of interleaved Us. In this example, the tag comprises three conductive strips 55a to 55c, strips 55a and 55c respectively being the outer strip and the inner strip of the pattern. The strips are spaced apart from one another by a same step. The two parallel branches of the U formed by inner strip 55c are spaced apart by a distance equal to the step separating strips 55a to 55c from one another. Thus, conductive strips 55a to 55c delimit two U-shaped dielectric strips, 57a and 57b, and a rectilinear dielectric strip 57c, between the parallel branches of the U formed by strip 55c. Conductive bridges 58a and 58b are formed on outer and inner dielectric strips, respectively 57a and 57c, thus delimiting three dielectric strip portions 59a to 59c of different lengths. To avoid stray coupling phenomena between resonant regions of the tag, central dielectric strip 57b is not shorted by a conductive bridge.

Tag 51 forms a structure with resonant elements capable of interfering with an electromagnetic signal transmitted by an RFID read terminal (not shown). As in the case of the RFID tags described in relation with FIGS. 3 and 4, each dielectric strip portion 59a to 59c determines, by its length, a resonance frequency of the tag. The tag resonance frequencies altogether define an identification code.

Figure 6:
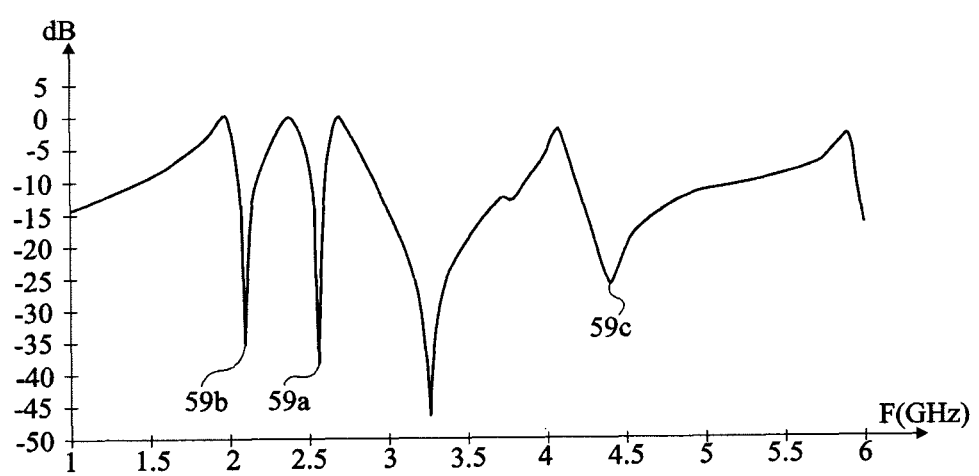
FIG. 6 schematically shows the power spectrum of the electromagnetic signal seen by a read terminal in the presence of the tag of FIG. 5.

FIG. 6 schematically shows the spectrum of the electromagnetic signal seen by a read terminal in the presence of tag 51 of FIG. 5. The spectrum comprises three lines 59a to 59c, respectively at frequencies on the order of 2.6 GHz, 2.2 GHz, and 4.4 GHz, respectively corresponding to the resonance frequencies linked to the dielectric strip portions having the same reference numerals. The shorter the length of a dielectric strip portion, the higher the associated resonance frequency. The read terminal can detect the presence of lines in the signal spectrum and determine the tag identification code. It should be noted that the spectrum peaks may also be used to code the identifier associated with the tag.

Figure 7:
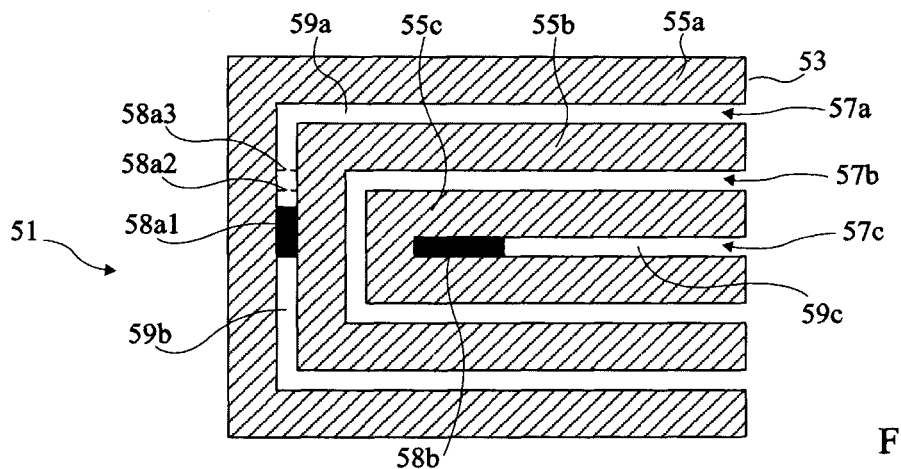
FIG. 7 is a top view schematically showing three alternative embodiments of the tag of FIG. 5.

FIG. 7, substantially identical to FIG. 5, schematically shows tag 51 for three different identification codes. The three codes correspond to three different lengths 58a1, 58a2, 58a3 of conductive bridge 58a, thus affecting the length of dielectric strip portion 59a, as shown in dotted lines in the drawing. Dielectric strip portions 59b and 59c have the same length for the three codes.

Figure 8:
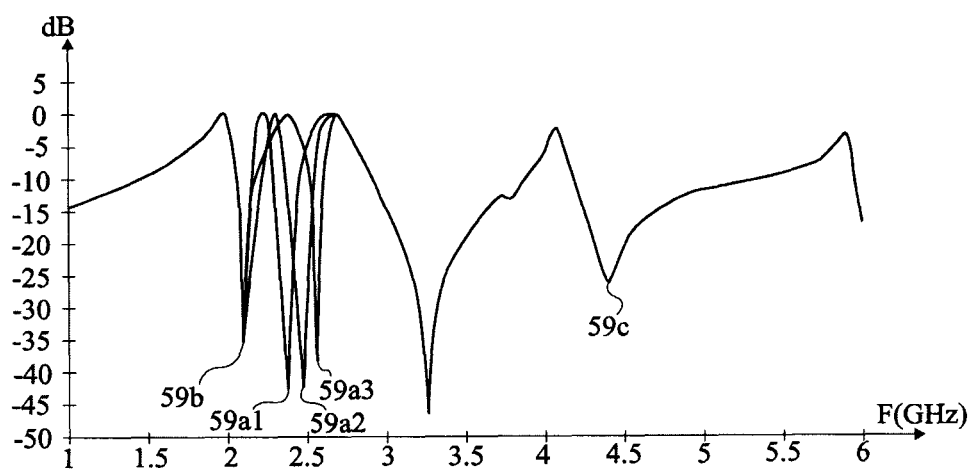
FIG. 8 schematically shows the superposition of the power spectrums of the electromagnetic signal seen by a read terminal in the presence of each of the tags of FIG. 7.

FIG. 8 schematically shows the superposition of the power spectrums of the electromagnetic signal seen by a read terminal in the presence of each of the tags of FIG. 7. When the length of dielectric strip portion 59a varies, the position of the corresponding strip 59a in the strip also varies. The spectrum superposition thus comprises three different strips 59a1, 59a2, and 59a3, corresponding to the three different lengths of dielectric strip portion 59a. According to an advantage of the present invention, a length modification of one of the dielectric strip portions has no influence upon the resonance frequencies associated with the other dielectric strip portions. Indeed, the spectrum superposition comprises a single line 59b corresponding to the resonance frequency linked to dielectric strip portion 59b and a single line 59c corresponding to the resonance frequency linked to dielectric strip portion 59c. As mentioned hereabove, the spectrum peaks may also be used to code the identifier associated with the tag.

It may be provided to associate one or several bits of an identification code with each dielectric strip portion. As an example, in the case of tag 51 (FIGS. 5 and 7), it may be provided to associate three bits of an identification code with each dielectric strip portion 59a to 59c. Each portion 59a to 59c may then take one of eight different lengths corresponding to eight different resonance frequencies. It will of course be ascertained that there is no overlapping between resonance frequency ranges associated with different dielectric strip portions.

Figure 9:
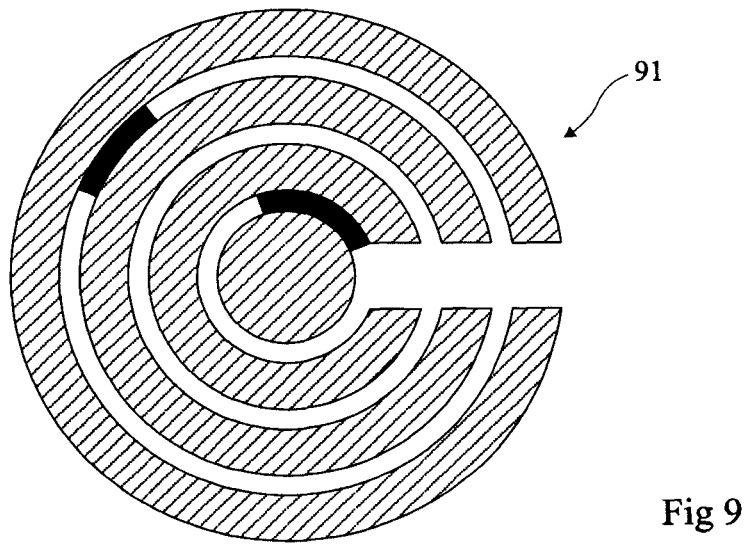
FIG. 9 schematically shows another embodiment of a chipless RFID tag.

FIG. 9 schematically shows another alternative embodiment of a chipless RFID tag 91. Tag 91 is similar to tag 51 of FIG. 5, except for the fact that the parallel conductive strips have the shape of concentric circle portions. The tag has substantially the same operating principle as tag 51.

An advantage of chipless RFID tags, U-shaped or in circle portions, of the type described in relation with FIGS. 5 and 9, is that they enable to store more data per surface area unit than tags of the type described in relation with FIG. 2. As an example, tag 51 of FIG. 5 enables to store a nine-bit identification code (three bits per dielectric strip portion) on a 17.5× 15-mm rectangular surface, for an operating frequency range from 2 to 5 GHz. The tag surface area can be strongly decreased by using higher identification frequencies.

Figure 10:
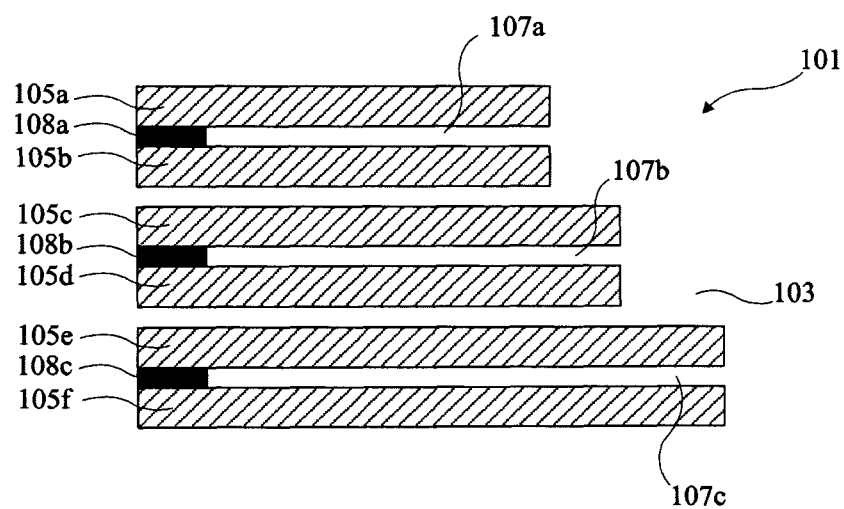
FIG. 10 schematically shows another embodiment of a chipless RFID tag.

FIG. 10 is a top view schematically showing another alternative embodiment of a chipless RFID tag 101. Tag 101 is formed on a dielectric support 103. A surface of support 103 has parallel rectilinear conductive strips 105a to 105f formed thereon. Strips 105a to 105f have the same width and are spaced apart from one another by a same step. Pairs of neighboring strips have the same length. In the shown example, neighboring strips 105a and 105b have a first length, the next neighboring strips 105c and 105d have a second length greater than the first length, and the next neighboring strips 105e and 105f have a third length greater than the second length. Thus, conductive strips 105a to 105d delimit three rectilinear dielectric strips of different lengths 107a to 107c, respectively between conductive strips 105a and 105b, 105c and 105d, and 105e and 105f. Conductive bridges 108a to 108c are formed, each at one end of one of dielectric strips 107a to 107c, interconnecting conductive strips of same length. Actually, the configuration of FIG. 10 is similar to the configuration of FIG. 3, with the difference that parallel conductive strips have different lengths and that the conductive bridges are formed at the end of the dielectric strips. Each dielectric strip defines a resonant circuit determining a resonance frequency of tag 101. The resonance frequencies of the tag altogether define an identification code.

It may be provided to associate with each dielectric strip 107a to 107c a bit of an identification code or, as in the example described in relation with FIG. 7, several bits of an identification code.

Specific embodiments of the present invention have been described. Various alterations, modifications, and improvements will readily occur to those skilled in the art.

In particular, chipless RFID tag patterns comprising three or four parallel conductive strips have been described hereabove in relation with FIGS. 3, 4, 5, 9, and 10. The present invention is not limited to these specific examples. Patterns comprising a larger number of conductive strips may especially be provided.

Further, the possibility of associating three bits of an identification code to each dielectric strip portion has been mentioned. The present invention is not limited to this specific case. It may especially be provided to associate a larger number of bits with each dielectric strip portion. However, this will decrease the interval, in the electromagnetic signal spectrum, between two resonance lines corresponding to two different lengths of a same dielectric strip portion. A sufficiently sensitive read terminal should thus be provided.

Further, RFID tags 51, 91, and 101, described in relation with FIGS. 5, 9, and 10, comprise dielectric strips not shorted by conductive bridges to avoid stray coupling phenomena between the resonant regions of the tag. The present invention is not limited to this specific case. It may be provided to use all dielectric strips for the identification code storage, as in the case of tag 41 of FIG. 4. It will then be ascertained to provide a sufficient distance between two dielectric strips to avoid stray coupling phenomena.

Further, in chipless RFID tags described in relation with FIGS. 3, 4, 5, 9, and 10, all the dielectric strips delimited by parallel conductive strips have the same width. The present invention is not limited to this specific case. One may in particular have dielectric strips of different lengths on a same tag. Similarly, the parallel conductive strips may have different widths.

Further, although one of the advantages of chipless RFID tags provided hereabove is the possibility of doing away with any conductive ground plane, one may also, for certain uses, and especially in a metal environment, use patterns of the type described in relation with FIGS. 3, 4, 5, 9, and 10 in combination with a ground plane.

The invention claimed is:

1. A chipless RFID tag comprising a plurality of separate parallel conductive strips formed on a dielectric support, wherein conductive bridges interconnect neighboring conductive strips, the conductive bridges delimiting, between the conductive strips, dielectric strip portions of different lengths, each dielectric strip portion determining a resonance frequency of the tag, the resonance frequencies of the tag altogether defining an identification code.

2. The tag of claim 1, wherein a dielectric strip not shorted by a conductive bridge is arranged between each pair of neighboring conductive strips interconnected by a conductive bridge.

3. The tag of claim 1, wherein all neighboring conductive strips are interconnected by conductive bridges.

4. The tag of claim 3, wherein the width of a conductive strip comprised between two neighboring dielectric strips is at least equal to three times the width of the adjacent conductive strips.

5. The tag of claim 1, wherein the conductive strips are U-shaped in top view.

6. The tag of claim 1, wherein the conductive strips have the shape of portions of circles in top view.

7. The tag of claim 1, wherein the conductive strips are rectilinear, pairs of neighboring strips having the same length and strips of different pairs having different lengths.

8. The tag of claim 1, wherein the dielectric strip portions all have the same width.

9. A method for coding data readable by an electromagnetic wave transceiver, comprising the steps of:
   forming a plurality of separate parallel conductive strips on a dielectric support;
   forming conductive bridges interconnecting neighboring conductive strips, so that the conductive bridges delimit, between the conductive strips, dielectric strip portions of different lengths, each dielectric strip portion determining a resonance frequency; and
   associating with each resonance frequency a portion of the data.

\* \* \* \* \*

UNITED STATES PATENT AND TRADEMARK OFFICE
CERTIFICATE OF CORRECTION

PATENT NO. : 8,556,184 B2
APPLICATION NO. : 13/578200
DATED : October 15, 2013
INVENTOR(S) : Perret et al.

Page 1 of 1

It is certified that error appears in the above-identified patent and that said Letters Patent is hereby corrected as shown below:

Title Page, Item (75) in the listing of the inventors: delete "Deepn" and replace with "Deepu"

Signed and Sealed this
Twelfth Day of November, 2013

Teresa Stanek Rea
*Deputy Director of the United States Patent and Trademark Office*